United States Patent
Ahuja et al.

(10) Patent No.: US 7,295,711 B1
(45) Date of Patent: Nov. 13, 2007

(54) METHOD AND APPARATUS FOR MERGING RELATED IMAGE SEGMENTS

(75) Inventors: Sachin Ahuja, Mountain View, CA (US); Gavin B. Horn, Oakland, CA (US); Michael Fleisher, Sunnyvale, CA (US); John S. Chen, San Jose, CA (US); Adityo Prakash, Redwood Shores, CA (US); Edward R. Ratner, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 818 days.

(21) Appl. No.: 10/692,466

(22) Filed: Oct. 23, 2003
(Under 37 CFR 1.47)

Related U.S. Application Data

(60) Provisional application No. 60/420,882, filed on Oct. 23, 2002.

(51) Int. Cl.
*G06K 9/62* (2006.01)
(52) U.S. Cl. ...................... 382/225; 382/164; 382/173
(58) Field of Classification Search ............... 345/622, 345/629, 630, 631, FOR. 216; 375/250; 382/164, 171, 173–180, 225; 716/2
See application file for complete search history.

(56) References Cited

U.S. PATENT DOCUMENTS 6,600,786 B1  7/2003  Prakash et al.
6,819,782 B1*  11/2004  Imagawa et al. ........... 382/115

FOREIGN PATENT DOCUMENTS

WO   WO 00/77735 A1   12/2000

\* cited by examiner

*Primary Examiner*—Matthew C. Bella
*Assistant Examiner*—G. F. Cunningham
(74) *Attorney, Agent, or Firm*—Okamoto & Benedicto LLP

(57) ABSTRACT

One embodiment of the invention relates to a method of merging segments to form supersegments in an image. The image consists of a plurality of segments that are constituent portions of the image. At least one candidate segment(s) and at least one neighboring segment(s) for each candidate segment are identified. An error statistic for each pair, consisting of a candidate segment and a corresponding neighboring segment, is computed. A neighboring segment is determined that results in a smallest error statistic for a given candidate segment. A determination is also made as to whether the smallest error statistic is sufficiently small to merit merging of the corresponding pair of segments. The corresponding pair of segments is merged to create one supersegment. The supersegment is a new segment including all pixels formerly contained in one of the two segments that were merged.

15 Claims, 7 Drawing Sheets

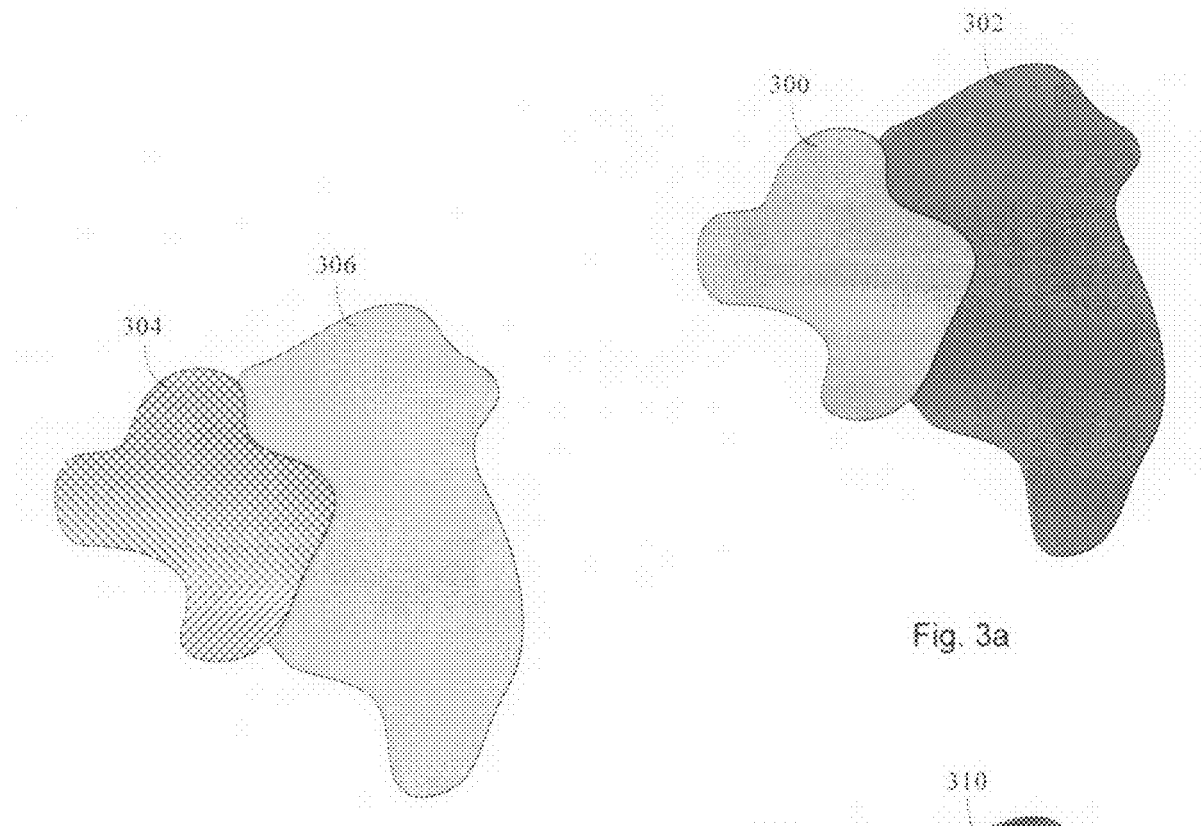
Fig. 3a
Fig. 3b
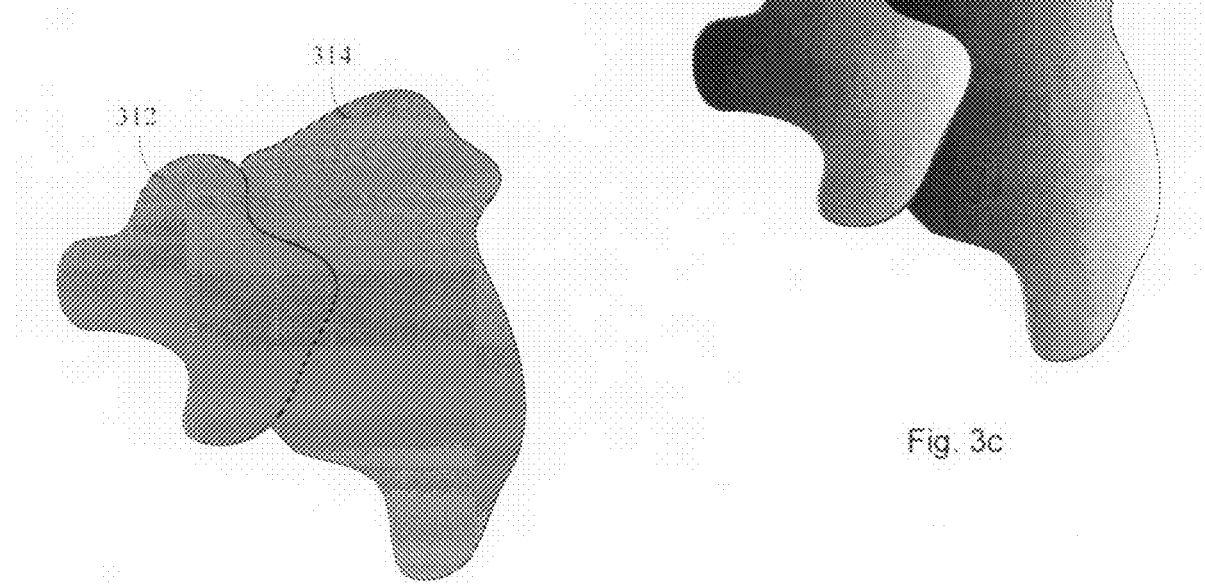
Fig. 3c
Fig. 3d

Calculation of Merging Parameters

METHOD AND APPARATUS FOR MERGING RELATED IMAGE SEGMENTS

CROSS-REFERENCES TO RELATED APPLICATION

The present application claims the benefit of U.S. Provisional Application No. 60/420,882, entitled "Method and Apparatus for Merging Related Image Segments," filed Oct. 23, 2002, by Sachin Ahuja et al., the disclosure of which is hereby incorporated by reference.

FIELD OF THE INVENTION

The present invention relates generally to the compression of video data.

DESCRIPTION OF THE BACKGROUND ART

For many reasons, video data (i.e., data representative of a sequence of video image frames) often requires compression. The compression may be needed to comply with bandwidth constraints, storage constraints, or other constraints.

As an example of a bandwidth constraint, a viewer might want to receive a video stream over an Internet connection having limited bandwidth at some point between the video source and the viewing device. For instance, where the connection to the viewing device has less bandwidth than is required for uncompressed video (such as a 380 Kilobit per second DSL line trying to download a 4 Megabit per second DVD quality movie), the video data would need to be compressed if the video data is to be received at the receiver in a timely manner. Similarly, where the allotted bandwidth must be shared among many devices (such as a broadband channel used for many simultaneous video-on-demand sessions) or among many applications (such as e-mail, file downloads and web access), the video data also would need to be compressed if the video data is to be received at the receiver in a timely manner.

Applications for compressed video over limited bandwidth include, for example, video streaming over the Internet, video conferencing, and digital interactive television. Satellite broadcasting and digital terrestrial television broadcasting are also examples of how bandwidth limitations can be dealt with using video compression. For instance, using half the bandwidth allows one to double the number of channels broadcast on a satellite television network. Alternatively, using half the bandwidth may reduce the cost of these systems considerably.

Storage for video data may also be constrained. For example, a video sequence may need to be stored on a hard disk where the storage space required for uncompressed video is greater than the size of the available storage on the hard disk. Examples of devices requiring video storage include video-on-demand servers, satellite video sources, personal video recorders ("PVR's", often referred to as "digital VCRs"), and personal computers. Other digital storage media can be used for video storage, such as DVD's, CD's and the like.

Compression allows video to be represented with fewer bits or symbols than the corresponding uncompressed video. It should be understood that a video sequence can include audio as well as video information, but herein compression is often discussed with reference to manipulation of just the video portion of such information. When video (or any other data) is compressed, it can be transmitted using less bandwidth and/or less channel time and it can be stored using less storage capacity. Consequently, much effort has gone into compression methods that achieve high compression ratios with good results.

A compression ratio is the ratio of the size (in bits, symbols, etc.) of uncompressed data to the corresponding compressed data. One constraint on getting higher and higher compression ratios is that the uncompressed data must be recoverable from the compressed data in a decompression process. When the uncompressed data need only be recovered approximately, which is often the case with video, higher compression ratios are possible. Compression where the data can only be recovered approximately is referred to as "lossy" compression, as opposed to perfectly recoverable, or "lossless," compression. Unless expressly mentioned, compression as used herein can refer to either lossy or lossless compression and is usually dictated by the application.

A compression system typically includes an encoder, a decoder and a channel for transmitting data between the two. In the case of a transmission system, the encoder encodes uncompressed data and transmits compressed data over the channel to the decoder, which then decompresses the received compressed data to recover the uncompressed data, either exactly (lossless) or approximately (lossy). Presumably, the channel has a limited available bandwidth requiring compression to handle the volume of data, but a limited channel is not required for compression to be used. In the case of a storage system, the encoder encodes uncompressed data and stores the compressed data in storage. When the data is needed (or at other times), the decoder recovers the uncompressed data (exactly or approximately) from the compressed data in storage. In either case, it should be understood that for compression to work, the encoder must convey via the compressed data enough information to allow the decoder to, at least approximately, reconstruct the original data.

A video sequence is often represented by a set of frames wherein each frame is an image and has a time element. The video sequence can be viewed by displaying each frame at the time indicated by its time element. For example, the first frame of a video sequence might be given a time element of 00:00:00:00 and the next frame given a time element of 00:00:00:01, where for example the rightmost two digits in the time element represent increments of $\frac{1}{30}$th of a second (the other pairs of digits may represent hours, minutes, and seconds). Where the video sequence is a digitized, two-dimensional sequence, each frame can be represented by a set of pixels, where each pixel is represented by a pixel color value and a location in a (virtual or otherwise) two-dimensional array of pixels. Thus, an uncompressed video sequence can be fully represented by a collection of data structures for frames, with a data structure for a frame comprising pixel color values for each pixel in the frame. In a typical application, a pixel color value might be represented by 24 bits of data, a frame represented by a 1024×768 array of pixels, and one second of video represented by 30 frames. In that application, 24×1024×768×30=566,231,040 bits (or approximately 71 megabytes) are used to represent one second of video. Clearly, when video sequences of significant length are desired, compression is useful and often necessary.

Most video compression schemes attempt to remove redundant information from the video data. Video sequences will often have temporal redundancy and spatial redundancy. Temporal redundancy occurs when the scenery (e.g., the pixel color values) is the same or similar from frame to frame. Spatial redundancy occurs when the pixel color values repeat (or are similar) within a frame. Most video signals contain a substantial amount of redundant information. For example, in a television news broadcast, only parts of the head of the speaker change significantly from frame to frame and most objects in the background remain stationary. If the scene is two seconds long, the sequence may well contain sixty repetitions of the representations of stationary portions of the scene.

In addition to eliminating redundancy, some video compression schemes also seek to eliminate superfluous information, such as information that is present in the uncompressed video but which can be eliminated without altering the video sequence enough to impair its visual quality. For example, some high spatial frequency effects can be eliminated from many video sequences, allowing for greater compression ratios, without substantially reducing the quality of the video sequence.

Spatial redundancy can be analyzed and reduced on a frame by frame basis (i.e., without needing to take into account other frames) using what is often referred to as "still-image compression," since the processes used to compress single still images can be used. Examples of existing still-image compression include the Joint Photographic Experts Group (JPEG) standard, wavelet compression and fractal compression. Quite often, reduction of spatial redundancy alone is not sufficient to get to desirable compression ratios. Additionally, features that are lost in the compression of some frames may appear in other frames resulting in flickering as features appear and disappear as each frame is displayed.

A common approach to reduction of temporal redundancy is to include a still image compression of a reference frame in the compressed data, followed by information for one or more subsequent frames conveying the differences between each subsequent frame and the reference frame. The reference frame is said to be "intra-coded" while subsequent frames are said to be "predicted." Intra-coded frames are often called "I-frames," while predicted frames are commonly referred to as "P-frames." Periodically, or according to some rule, a new reference frame is generated and used as the comparison for later subsequent frames. In some cases, the time element for the reference frame is always earlier than the time element for subsequent frames that reference the reference frame, but in other cases, a subsequent frame can reference frames before or after the subsequent frame. Of course, where the subsequent frame references a frame that comes after, recovery of the subsequent frame might be delayed until the later frame is recovered. Furthermore, subsequent frames may not reference an intra-coded frame directly but may instead reference previous or subsequent predicted frames.

One approach to representing a predicted frame with fewer bits or symbols is block matching, a form of temporal redundancy reduction in which blocks of pixels in the predicted frame are compared with blocks of pixels in the referenced frame(s) and the compressed predicted frame is represented by indications of matching blocks rather than pixel color values for each pixel in the predicted frame. With block matching, the predicted frame is subdivided into blocks (more generally, into polygons), and each block is tracked between the predicted frame and the referenced frame(s) and represented by a motion vector. When more than one referenced frame is used and the referenced frame cannot be identified by context, the predicted frame might be represented by both a motion vector and an indication of the applicable referenced frame for each constituent block. A motion vector for a block in an N-dimensional video frame typically has N components, one in each coordinate space, where each component represents the offset between the block in a referenced frame and a predicted frame, but a motion vector can be any other suitable form of representation, whether or not it falls within the mathematical definition of a vector.

The MPEG standards, created by the Moving Pictures Experts Group, and their variants are examples of compression routines that use block matching. An MPEG encoder encodes the first frame in its input sequence in its entirety as an intra-frame, or I-frame, using still-image compression. The intra-frame might be compressed by having the frame divided into 16 pixel by 16 pixel blocks and having each of those blocks encoded. A predicted frame is then encoded by indicating matching blocks, where a block in the predicted frame matches a block in the intra-frame and motion vectors are associated with those blocks.

In most cases, a predicted frame cannot be reconstructed just from knowledge of referenced frames, block matches and motion vectors. A coarse approximation of the predicted frame might be reconstructible by starting with a blank image and copying each matching block from a referenced frame, shifting the relative position of the block according to the associated motion vector. However, gaps will remain where pixels of the predicted frame did not match any block in the reference frame(s) and differences might still exist where the blocks did not match exactly. Gaps are to be expected, such as where the scene captured in the video sequence is of a first object passing in front of a second object. If the second object is occluded in the referenced frame but not in the predicted frame, then there will be no matching information in the referenced frame that would allow for reconstruction of the predicted frame pixels that are associated with the second object.

One way to handle such problems is to run the block-matching process, determine what is left out and encode that as "residue". For example, a predicted frame can be encoded as a set of block elements, where each block element represents a block from a referenced frame and an associated motion vector, and a residue correcting the pixels of the predicted frame that are not represented (or are not represented correctly enough) by the block information. In MPEG encoding, the residue is encoded using JPEG.

Block matching is suboptimal in that it fails to take advantage of known physical characteristics or other information inherent in the images. The block method is both arbitrary and inexact, as the blocks generally do not have any relationship with real objects in the scene represented by the image. For example, a given block may comprise a part of an object, a whole object, or even multiple dissimilar objects with unrelated motion. Additional inefficiencies occur because the resultant residues for block-based matching are generally noisy and patchy, making them difficult to compress.

Segmentation followed by segment matching often provides better compression ratios than block matching because segments can be encoded more tightly than arbitrary blocks and segment matching leaves less of a residue. As used herein, a "segment" refers to a representation (or designation) of a set of pixels of an image, and a region of the image might also be referred to as a segment. Typically, a "segment" refers to a representation (or designation) of a set of pixels of an image where the pixels within a given segment have color values that are within a narrow range of variation and where pixels typically have wider variations across segment boundaries. Thus, dividing an image into segments of variable sizes and shapes allows for truer representations of image objects and thus eliminates many of the inefficiencies associated with block-based compression.

Previous patent applications in this general area of technology include U.S. patent application Ser. No. 09/550,705, filed Apr. 17, 2000, and entitled "Method and Apparatus for Efficient Video Processing" (hereinafter referred to as "Prakash I") and U.S. patent application Ser. No. 09/591,438, filed Jun. 9, 2000, and entitled "Method and Apparatus for Digital Image Segmentation" (hereinafter referred to as "Prakash II"). Prakash I and Prakash II discuss an encoding process including the segmentation of an image frame into such image components. As part of the encoding process, motion vectors are calculated that represent displacements of segments from one image frame to a subsequent image frame. These motion vectors are then included in the compressed data so that a decoder can use the information to reconstruct the second image frame.

Segmentation information need not be included in the compressed data if the decoder can extract the segmentation information from other data. For example, the decoder can extract segmentation information by segmenting an I-frame (or another predicted frame that the decoder has already reconstructed). Preferably, the encoder uses the same segmentation process as the decoder. For a further discussion, please refer to Prakash I and Prakash II. With segmentation and segment matching, a predicted frame can be represented by a set of segment matches, wherein each segment match references a segment of a referenced frame and a motion vector indicating the offset of the segment between the referenced frame and the predicted frame. While segmentation followed by segment matching provides considerable compression ratios, some redundancy may remain. Attention should be paid to the faithfulness of the segmentation in representing real image objects in order to realize better compression ratios.

SUMMARY

The present invention improves the performance of segmentation-based video compression schemes by merging neighboring segments that are likely to represent parts of the same object. Such merged segments only require one motion vector to be encoded, thus reducing redundancy in the information sent by an encoder to a decoder.

BRIEF DESCRIPTION OF THE DRAWINGS

A further understanding of the nature and the advantages of the invention disclosed herein may be realized by reference to the remaining portions of the specification and the attached drawings.

FIGS. 3a, 3b, 3c, and 3d are examples illustrating the utility of several merging parameters in accordance with an embodiment of the invention.

To aid in understanding, identical reference numerals have been used wherever possible to designate identical elements in the figures.

DETAILED DESCRIPTION

1 Introduction and Overview

Figure 1:
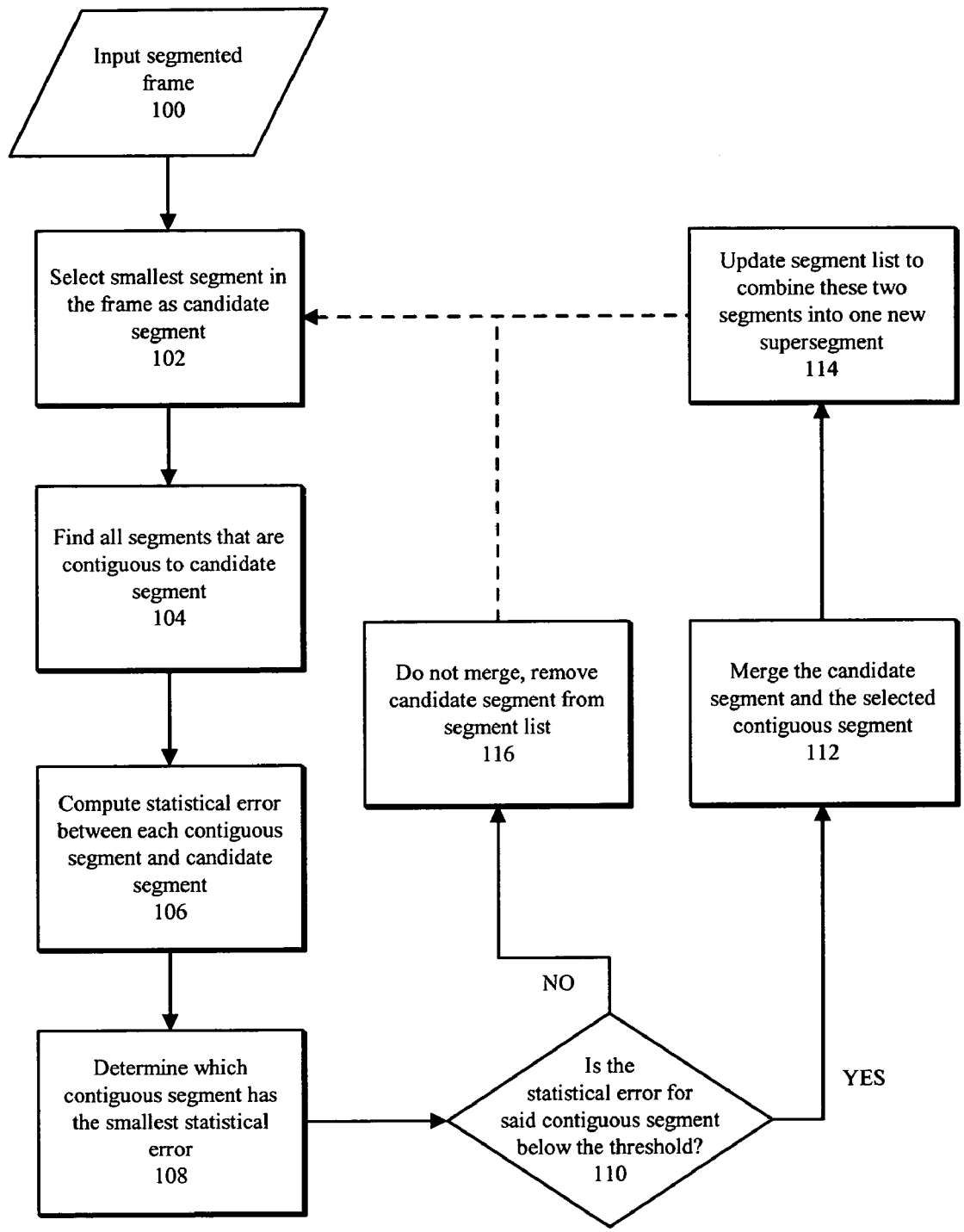
FIG. 1 is a flow chart describing the main steps involved in the creation of supersegments in accordance with an embodiment of the invention.

A segmentation-based video compression system according to the preferred embodiment of the present invention, involving an encoder, a decoder, and a channel between them, will now be described in detail. The methods and apparatus described below can be used in systems where the decoder is passive or active, with an active decoder being a decoder that performs some processing that is also performed by the encoder but that is repeated so that the results of the processing do not need to be conveyed from the encoder to the decoder through the compressed data. In the preferred embodiment, the system includes an active decoder. An example of such processing performed by both encoder and decoder is determining structural information inherent to the image (e.g., image segmentation, geometry, color and/or brightness), for use in predicting other frames. Because the decoder is capable of independently determining the structural information used to predict a new frame, such information need not be explicitly included in the compressed data. Rather, the compressed data need only include information that the encoder knows the decoder cannot determine on its own.

Often, the pixels representing a single object from a captured scene fall into multiple segments. In other words, the object may be comprised of multiple segments. For example, a fold in a shirt might cause enough of a color variation or boundary effect that a segmentation process divides the image of the shirt into multiple segments. In such cases, the motion of each of those segments might be identical, at least over several frames. If such redundancy is recognized and reduced, greater compression results. As used herein, treating multiple segments as a single segment, called a supersegment, for motion matching purposes is referred to as segment merging. In the preferred embodiment, once multiple segments are merged to form a supersegment, the multiple segments remain merged permanently. In an alternative embodiment, the multiple merged segments may later be separated.

Segment merging permits more efficient coding since considering multiple segments as a single supersegment and coding a single motion vector for each supersegment reduces the amount of motion information that must be encoded for a frame. Arithmetic coding can be used to further compress the motion data.

A method of merging neighboring segments according to one embodiment of the present invention comprises the following steps. A plurality of image segments in a video frame is identified according to some method of segmentation. A segment is selected as a potential candidate segment for merging. All segments that are neighbors of the candidate segment are found, where a neighboring segment is a segment that shares a common boundary with the candidate segment.

In other embodiments, neighboring segments may for instance include all segments that intersect a bounding box around the candidate segment. One or more merging parameters selected from the group consisting of mean color difference, color variance difference, length of the common boundary, total length of the candidate segment's boundary, area of the neighboring segment, area of the candidate segment, and gradient along the common boundary are calculated for each neighboring segment relative to the candidate segment. At least one of these merging parameters is used to compute an error statistic for each neighboring segment. If the proportion of common boundary length to the total length of the candidate segment's boundary is too small, or if the area of the neighboring segment is less than the area of the candidate segment, then the error statistic is set at a high value. If the error statistic for the neighboring segment with the smallest such error among all neighbors is below some threshold (which may vary according to the area of the candidate segment), then this neighboring segment with smallest error is associated to the candidate segment. In this case, the two segments are merged to create a single supersegment. The two segments are not merged if the smallest error statistic is not below the threshold value. A new candidate segment may then be selected, and the process continues until all eligible segments have been considered as candidate segments. In one embodiment, all segments below a threshold area are considered as candidate segments.

An embodiment of the present invention also provides an improved method for compressing video data including the process of combining some neighboring segments to form one or more supersegments. In this method, an encoder and a decoder may be trained to perform some identical processing in order to minimize the amount of data the encoder must provide to the decoder to reconstruct a video sequence. According to one embodiment of the present invention, such a method includes the steps of: identifying a plurality of image segments present in a predicted frame and one or more reference or previously reconstructed predicted frames; identifying at least one candidate segment; identifying segments that are neighbors of each candidate segment; computing a pair error statistic for each pair consisting of a candidate segment and a neighboring segment; selecting the neighboring segment with smallest error statistic for a given candidate segment; and merging said pair of segments into a single supersegment when the pair's error statistic is below a threshold value.

The present application also discloses an apparatus for merging neighboring image segments according to the heuristics mentioned above. The application further discloses a system for carrying out the process of encoding and decoding video data that includes the apparatus for merging neighboring segments.

2 Video Compression System

Figure 2A:
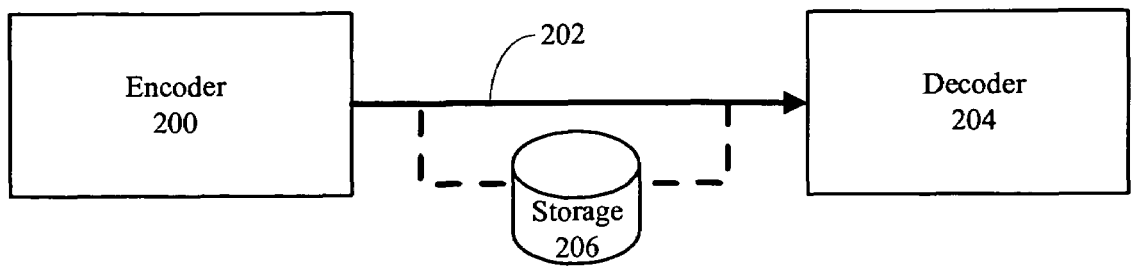
FIG. 2a is a block diagram illustrating a system for encoding and decoding video data in accordance with an embodiment of the invention.

FIG. 2a is a simplified block diagram of an embodiment of a video compression system in accordance with an embodiment of the invention. An encoder 200 encodes a video signal as a compressed bit stream. A channel 202 transmits said bitstream between the encoder 200 and a decoder 204. The decoder 204 uses the compressed bitstream to reconstruct the original video signal, either exactly or approximately. The compressed data may be stored in a storage unit 206 or it may be transmitted directly to the decoder 204 via the channel 202, depending on the application.

Figure 2B:
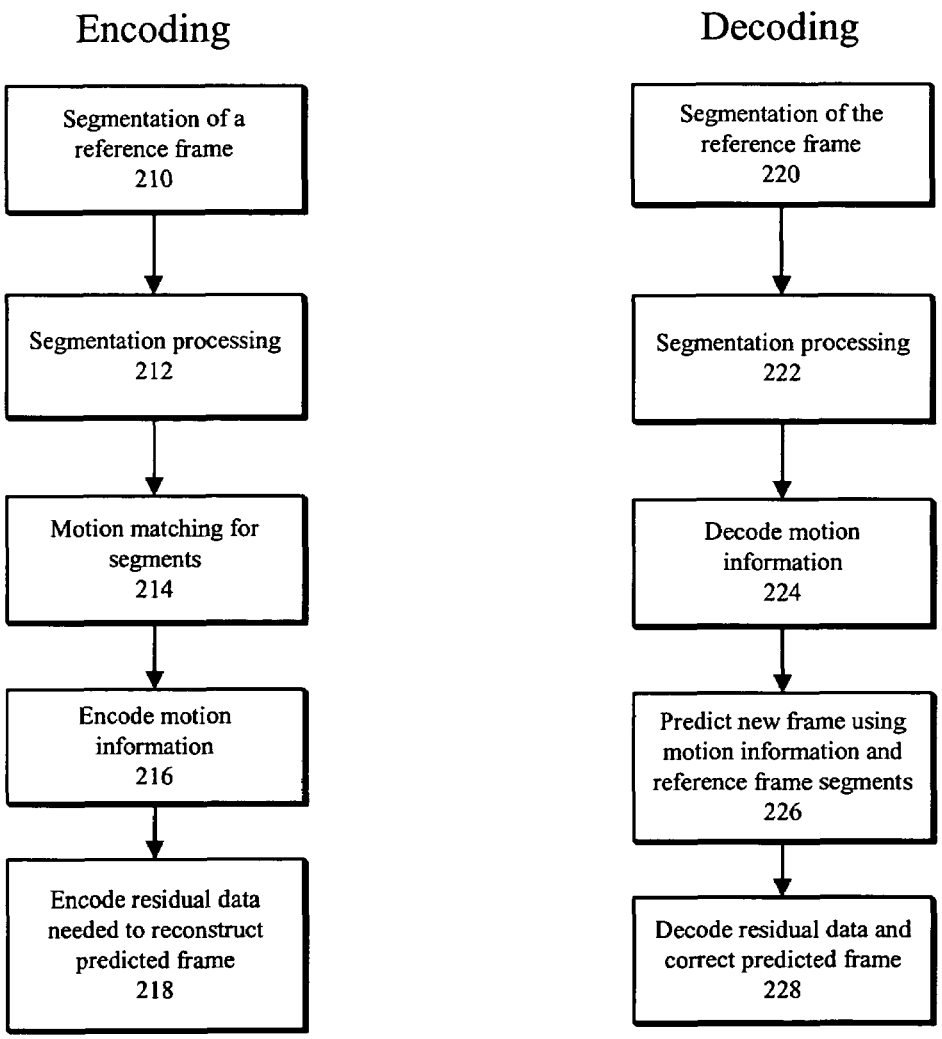
FIG. 2b illustrates several key steps in a segmentation-based approach to encoding and decoding video data carried out by an encoder and a decoder in accordance with an embodiment of the invention.

FIG. 2b illustrates some of the major functions performed by the encoder 200 and the decoder 204 in the case of segmentation-based video compression in accordance with an embodiment of the invention. These steps represent key functions in a preferred embodiment, but they are not intended to be exhaustive. Refer for example to the application referenced herein as Prakash I for a more complete discussion.

In step 210, the encoder 200 segments a reference frame into a plurality of image segments. In step 212, the encoder 200 performs further processing on the segmentation produced in step 210. Such further processing may for instance include the merging of two or more related segments into supersegments, as described below with reference to FIG. 1. In step 214, the encoder 200 determines the motion vectors for each segment or supersegment in the reference frame that best express how each segment or supersegment should be displaced to form a prediction for a new frame in the video sequence. In step 216, the encoder 200 compresses and encodes this motion data. Finally, in step 218, the encoder 200 encodes residual data needed to allow the decoder to reconstruct the image from its prediction. The motion data and the residual data that are produced by the encoder 200 are sent by channel 202 to the decoder 204.

In step 220, the decoder 204 divides a reference frame into constituent segments, preferably using the same process employed by the encoder 200 in step 210. By independently forming this segmentation, preferably identical to the one formed by the encoder 200, the decoder 204 greatly reduces the amount of information it must receive in order to reconstruct images. In step 222, the decoder 204 carries out additional processing on the segmentation from step 220. Again, this processing is preferably identical to that performed by the encoder 200 in step 212. Such additional processing may for instance include the merging of two or more segments into supersegments, as described with reference to FIG. 1. In step 224, the decoder 204 decodes the motion data for each segment or supersegment contained in the reference frame. In step 226, the decoder 204 uses this motion data to create a prediction for the new frame by shifting each segment or supersegment in the reference frame by its corresponding motion vector. In step 228, the decoder 204 decodes the residual data provided by the encoder 200 and uses said data to correct its prediction of the new frame, resulting in an exact or approximate reconstruction of the new frame (depending on whether loss-less or lossy compression, respectively, is used).

Any suitable method can be used to create the initial segmentation, such as for example those techniques described in Prakash II. The encoder 200 and the decoder 204, working on the same image frame and using the same segmentation algorithm, preferably create identical image segmentations and make identical choices to merge segments. The remainder of the specification will further describe this process for merging two or more segments to reduce redundancies that remain after segmentation.

3 Merging Segments

FIG. 1 is a flow chart outlining the steps involved in the process of merging segments to form supersegments in a preferred embodiment of the invention. Note that in the process for encoding and decoding video described in FIG. 2b, this process occurs in steps 212 and steps 222. With reference to FIG. 1, in step 100, an initial segmentation for a given frame, in which preferably every pixel in the frame belongs to exactly one segment, is taken as input. In step 102, the smallest segment in the frame is selected as a candidate for merging. Note that segment size is used to select this candidate in the preferred embodiment, but other criteria may be used to select a candidate segment for merging in alternative embodiments.

In step 104, all segments that are contiguous to the candidate segment are located, wherein contiguous means that the two segments share a common boundary. A boundary between segments is a curve comprised of horizontal and vertical line segments that lie between pixels of two different segments, as discussed elsewhere with reference to FIG. 4. (A boundary is thus a one-dimensional curve lying in a two-dimensional plane.) In another embodiment, two segments may also be considered contiguous if they have a pair of diagonally adjacent pixels. The initial segmentation may provide this information about contiguous segments, or a separate process, such as a raster scan of the frame in which transitions across segment boundaries are recorded, may be used. In another embodiment, all segments that are within a certain distance of the boundary of the candidate segment are located in the equivalent of step 104. For example all segments that can be reached by walking a Manhattan distance of 5 from the boundary of the segment may be located. In yet another embodiment, all segments that intersect a rectangular bounding box around the candidate segment are located. For example, the left and right sides of a bounding box may be defined relative to the extreme left and right pixels of the candidate segment, respectively. Similarly the top and bottom of the bounding box may be defined relative to the extreme top and bottom pixels of the candidate segment. In one embodiment, the bounding box is defined to be j pixels wider and k pixels higher on each side than the minimum bounding box required to cover the segment, where j and k are integral numbers of pixels. This bounding box will be referred to as an extended bounding box. The contiguous or nearby segments located at this step are referred to herein as neighboring segments.

In step 106, an error statistic is computed for each pair consisting of the candidate segment and one of its neighboring segments. The calculation of this error statistic is discussed further elsewhere in the specification. In step 108, the error statistics for all neighboring segments from step 106 are compared and the neighboring segment with the smallest error is selected. In the case where two or more neighboring segments have similar error statistics, a tiebreaker such as minimal segment size can be used to select one of these segments. In step 110, the error statistic for the selected neighboring segment is compared to a threshold function. The selected neighboring segment and the candidate segment are merged if the error is below said threshold function's value. Said threshold function may vary according to the area of the candidate segment, in which case the threshold value is lower for larger candidate segments to prevent large errors resulting from erroneous merging. In another embodiment, additional criteria for merging may be considered at this step. If the decision is made to merge segments in step 110, then in step 112 the pixels in these two segments are redefined as belonging to one new supersegment, and in step 114 the segment list for the frame is updated to reflect this change. The process then returns to step 102 and takes the next smallest segment as a new candidate segment. If in step 110 the decision is made not to merge the two segments, then the candidate segment is removed from the list of segments in step 116 and the process continues by taking the next smallest segment as a new candidate segment in step 102.

This process repeats until every eligible segment in the frame has been considered as a candidate segment so that every potential merging pair is considered. Note in particular that a supersegment formed at an earlier step may be taken as a candidate segment or as a neighboring segment at a later step, allowing a resulting supersegment to include more than two original segments. In one embodiment, only candidate segments up to a maximum size are considered eligible for merging. In another embodiment, more than one neighboring segment may be merged with the candidate segment. For example a candidate segment may merge with all of its neighboring segments that are below a threshold value. As another example, a candidate segment may serially merge with one or more of its neighboring segments, where the error statistics relative to the new candidate supersegment are recalculated after each merging operation.

The criteria calculated in step 106 of FIG. 1 for deciding whether to merge multiple segments into supersegments can vary, but preferably in steps 212 and 212 of FIG. 2b, respectively, the encoder 200 and decoder 204 create identical supersegments (i.e., both perform the same merging operations). Some exemplary criteria used in the preferred embodiment are described below. These criteria determine how similar a candidate segment and a neighboring segment are in color and texture and how sharp their boundary transition is, and they thus provide good predictors of how likely it is that the segments represent parts of the same object in the image frame. Segments that are part of the same object are most likely to have the same or similar motion vectors, so merging these segments will for instance result in bit savings in the encoding of motion vectors during video compression. However, it should be noted that the main criterion used herein to decide whether to merge segments is color similarity.

4 Merging Parameters

The system obtains a candidate segment from within a first image frame. Subsequent to obtaining a candidate segment, the system determines which segments are neighbors of the candidate segment. In the preferred embodiment, a neighboring segment must share a common boundary with the candidate. In another embodiment, a neighbor segment is a segment that is spatially near to the candidate segment but does not actually share a common boundary. For example, a neighbor segment could be any segment within an extended bounding box around the candidate segment. In this embodiment, the candidate segment may not actually merge with the neighbor segment with which it does not share a common boundary, but it may merge with a third segment that does share a common boundary with the neighbor segment. In this instance the merging parameters calculated between the neighbor segment and the candidate segment might be used to modify the merging parameters between the resulting supersegment and the neighbor segment.

The system selects a candidate segment and a neighboring segment and considers certain pair statistics, or merging parameters. These merging parameters include one or more items selected from the group consisting of the difference in mean (or median) color, the ratio of color variances, boundary gradient, common boundary length, total boundary length of the candidate segment, area of the candidate segment, and area of the neighboring segment. The importance of several of these merging parameters is illustrated in the examples in FIGS. 3a, 3b, 3c, and 3d. Four pairs of contiguous segments are shown. Segments 300 and 302 in FIG. 3a are each of uniform color but their colors are noticeably different. The difference in mean color indicates that these segments should not be merged. Segments 304 and 306 in FIG. 3b have similar mean color, but they differ significantly in texture. While their mean color values will be the same, the difference in their color variances indicates that this pair should not be merged. Segments 308 and 310 in FIG. 3c have approximately the same mean color and color variance. However, the direction of the color fade in the two segments causes a very noticeable color transition locally at their common boundary. The nontrivial gradient along their boundary indicates a sharp edge and thus suggests that the two segments should not be merged. Segments 312 and 314 in FIG. 3d are the same in mean color and variance, and there is no sharp boundary delineating them. These segments are likely to be part of the same object so they should be merged. In practice, however, whether any of these pairs of segments are merged is determined by which set of merging parameters is used to decide whether they should be merged. These example pairs are not exhaustive but are rather intended to illustrate how several of the merging parameters may be used to distinguish between segments that may otherwise appear to be similar.

Figure 4:
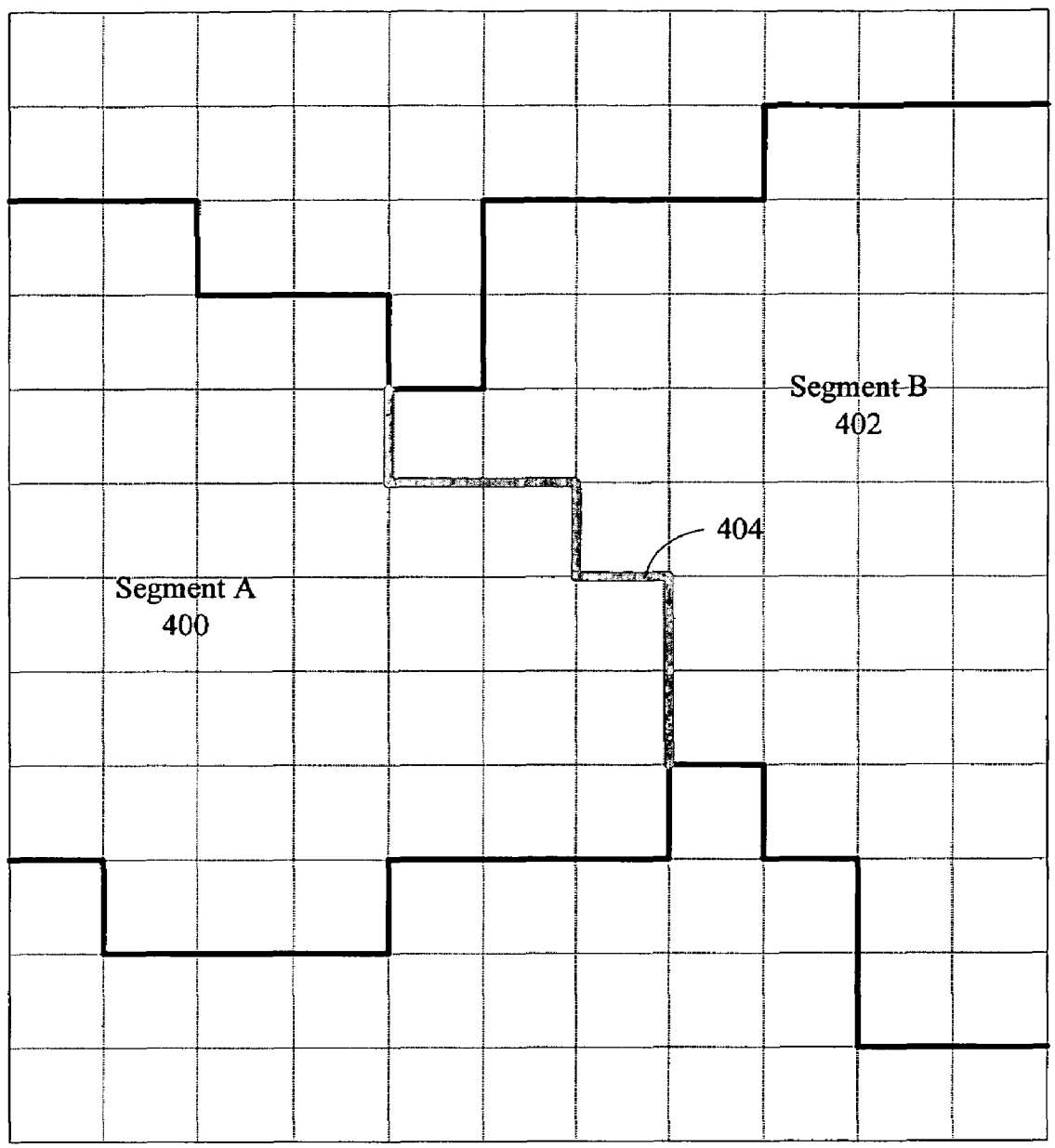
FIG. 4 is an illustration of the boundary between two segments in accordance with an embodiment of the invention.

In the preferred embodiment, the merging parameters are computed within a neighborhood of the common boundary between the two segments. A portion of the boundary consists of the edge between two pixels, where one pixel belongs to the candidate segment and the other pixel belongs to the neighboring segment. These boundary edges are either horizontal or vertical since only pixels that are horizontally adjacent or vertically adjacent are considered to touch in the preferred embodiment. The common boundary between two segments consists of at least one continuous sequence of these boundary edges (but may include more than one sequence if two irregular segments intersect in two or more unconnected places). FIG. 4 is a close-up view of an image frame illustrating the common boundary between two segments. Each square in the grid is meant to represent a single pixel. Segment 400 shares boundary 404 with segment 402. Note that the boundary 404 is comprised of a sequence of one-pixel-long edges.

In the preferred embodiment, merging parameters are computed in a neighborhood of each boundary edge and then compiled to form an error statistic for the two segments. In another embodiment, some of the merging parameters are computed within a neighborhood of the common boundary between the two segments, while other merging parameters are computed over the entire segments. For example, the mean and color variance may be computed over the entire segment, while the gradient error is only computed in the neighborhood of the common boundary.

Figure 5:
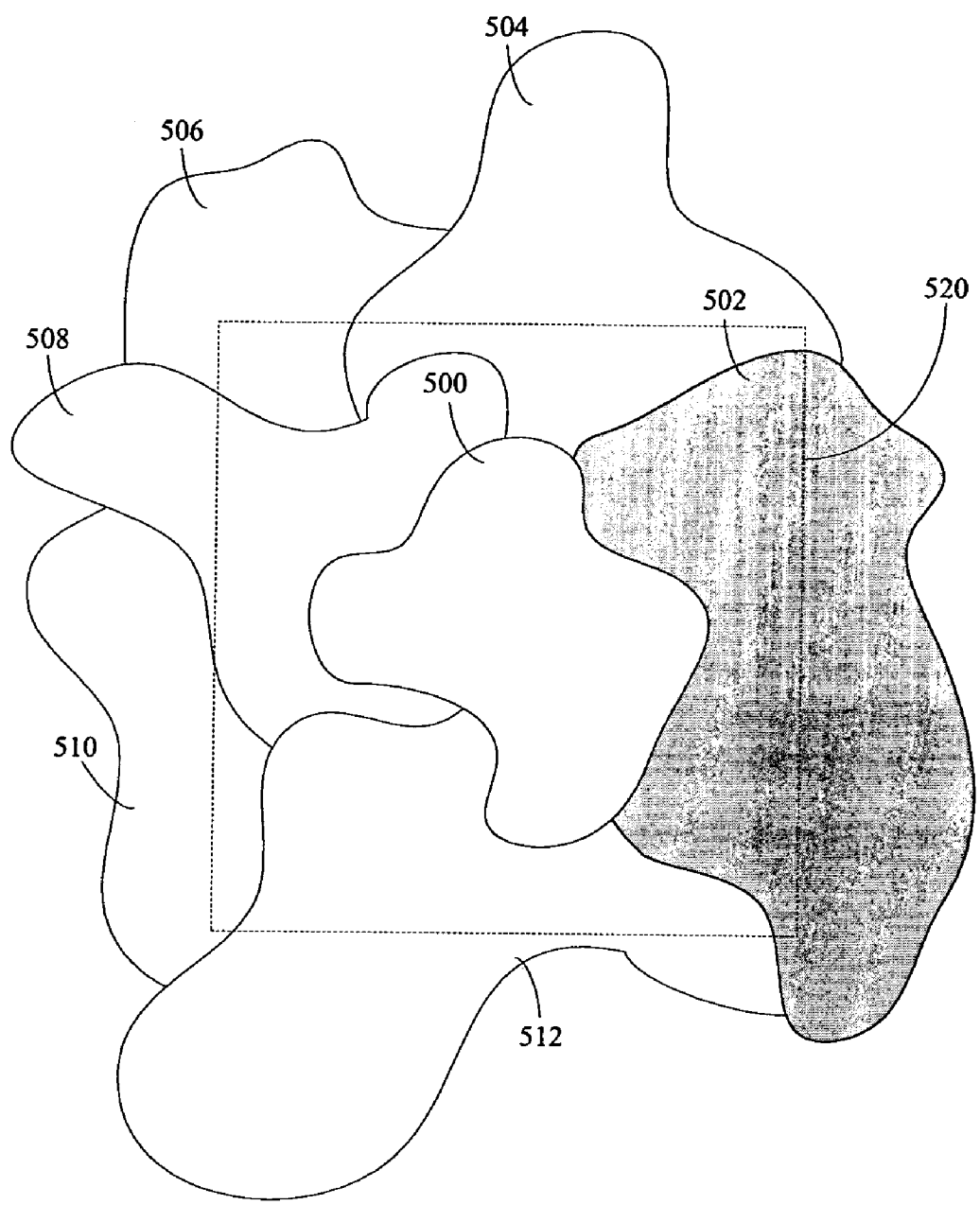
FIG. 5 is an illustration of an extended bounding box around a candidate segment in accordance with an embodiment of the invention.

In yet another embodiment, some of the merging parameters are computed over the entire candidate segment and only a portion of the neighboring segment. For example, the mean and color variance may be computed for the entire candidate segment, while they may be computed for only the portion of the neighboring segment that falls within an extended bounding box for the candidate segment. FIG. 5 illustrates an extended bounding box 520 around a candidate segment 500. Segments 502, 504, 506, 508, 510, and 512 are all of the segments that neighbor candidate segment 500. As merging parameters are computed for the pair consisting of segment 500 and segment 502 in this embodiment, only the pixels of segment 502 that lie within the extended bounding box 520 are considered to compute mean color and variance.

Figure 6:
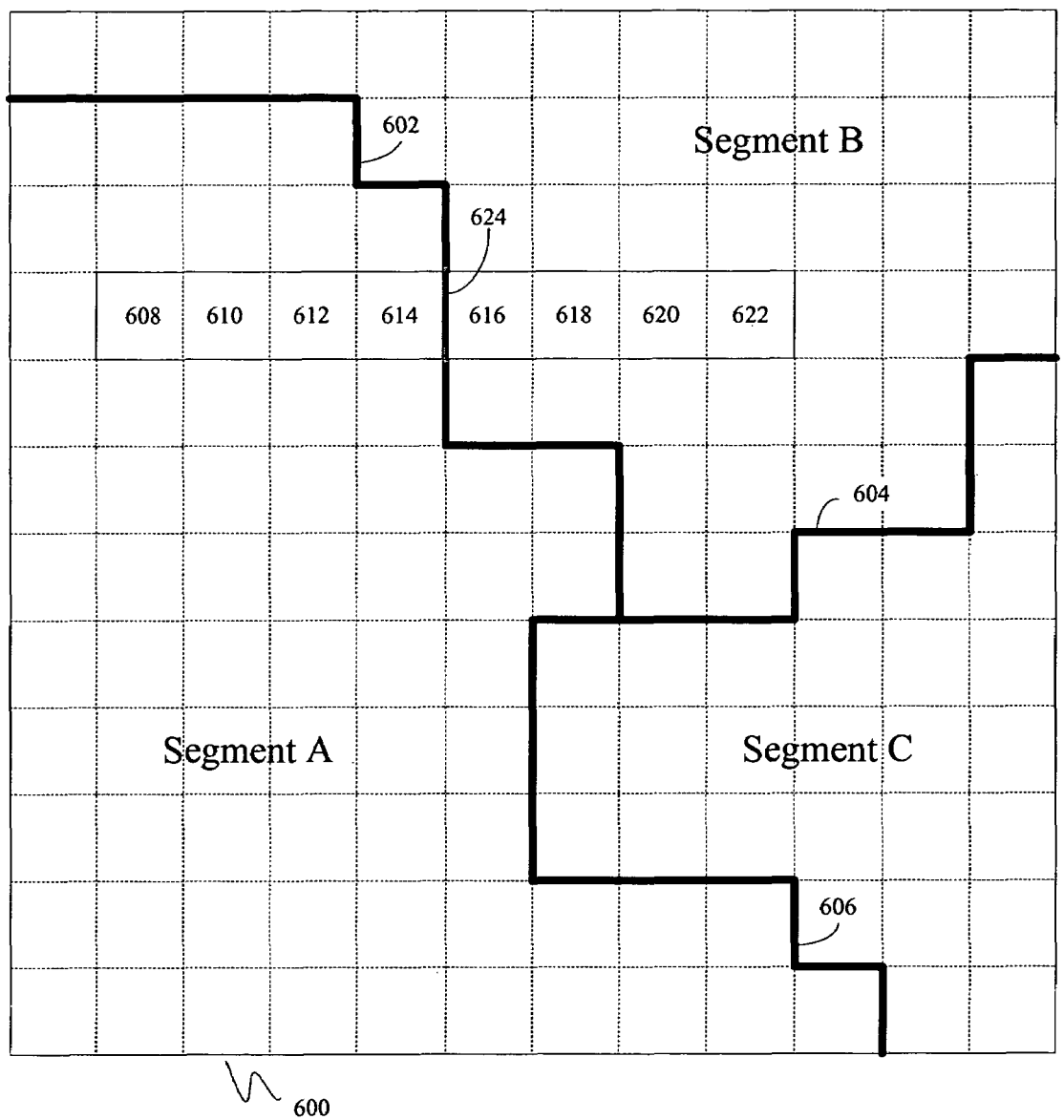
FIG. 6 is an illustration of how merging parameters are computed along the common boundary between two segments in accordance with an embodiment of the invention.

Preferably, to compute merging parameters at a given boundary edge, the system considers a band of several pixels in linear alignment on either side of and orthogonal to said boundary edge. The band may for instance consist of four pixels on either side of the boundary edge. FIG. 6 is an enlarged view of an image neighborhood 600 including three mutually adjacent segments: segment A, segment B, and segment C. The darkened lines 602, 604, and 606 represent portions of the common boundaries between segment A and B, B and C, and C and A, respectively. In computing the merging parameters for segments A and B, pair statistics are computed for each one-pixel-wide edge of their common boundary 602. The highlighted segment 624 is a one-pixel-wide edge of this boundary 602. The eight highlighted pixels, 608, 610, 612, and 614 in segment A and 616, 618, 620, and 622 in segment B, form the band of pixels used to compute merging parameters at boundary edge 624.

The system determines a local color mean for the pixels in each segment contained in this band surrounding boundary portion 624. For each of three color components (e.g. Y, U, and V components, where Y is the luminance and U and V are two chrominance values), the mean value $m_A$ in pixels 608, 610, 612, and 614 and the mean value $m_B$ of pixels 616, 618, 620, and 622 are computed. The differences $\Delta m = |m_A - m_B|$ are computed for each color component. In an alternative embodiment, the medians of the pixel color values may be used in place of the means.

The system also determines a local color variance for the pixels in each segment contained in this band surrounding boundary edge 624. For a set of values $x_1, x_2, \ldots, x_n$, if the mean value is $avg(x)$, then a variance measure is defined as $$v = (1/n) \sum_{i=1}^{n}$$

$[x_i - avg(x)]^2$. Considering the variance is important because segments can have similar averaged color but have different textures, or local variations in color. For example, a segment consisting of a black and white chessboard might have the same mean color as a segment consisting of a grey square of uniform color, but they are still very different segments. The variance provides a measure of these local color variations or textures within segments and thus helps to determine just how similar adjacent segments are. For each of three color components (e.g. Y, U, and V components as before), the variance $v_A$ of pixels 608, 610, 612, and 614 and the variance $v_B$ of pixels 616, 618, 620, and 622 are computed. The ratios $$\left(\frac{1+v_A}{1+v_B}\right)$$

and $$\left(\frac{1+v_A}{1+v_B}\right)$$

are computed for each of the three color components, and the variance changes $$\Delta v = \max\left\{\left(\frac{1+v_A}{1+v_B}\right), \left(\frac{1+v_B}{1+v_A}\right)\right\}$$

for each color component are found.

In another embodiment, the variance is estimated using the range of values $x_1, x_2, \ldots, x_n$. For example, the variance may be defined as $v=(\max(x)-\min(x))/C$, where C is a constant that is chosen based on the number of elements n. This estimate, which requires less computation than the variance defined above, is useful since it can also distinguish a textured area (like a black and white chessboard) from an area with uniform color.

The values $\Delta m$ and $\Delta v$ are computed as above for each edge of the common boundary between the two relevant segments and for each of the three color components. The corresponding values at each boundary edge are multiplied together to generate a local color error component $\Delta m \cdot \Delta v$ for each color component. These local color error components are summed, resulting in a single local color error at each boundary edge. Using subscripts to denote the color components, the local color error at a boundary edge is $c = \Delta m_Y \Delta v_Y + \Delta m_U \Delta v_U + \Delta m_V \Delta v_V$. The medians of every set of three such local color errors c at consecutive boundary edges are determined, and the mean of all such medians is calculated to produce a median-filtered average color variation between the two neighboring segments, $\Delta c$. This average color variation $\Delta c$ will be used to calculate a final error statistic E for the two segments.

In another embodiment, local color error components $\Delta m \cdot \Delta v$ are computed as before for each color. Each color component is then median-filtered along the common boundary, resulting in three median-filtered average color variation components. The Euclidean norm of the vector comprised of these three components results in an overall average color variation, $\Delta c$. The Euclidean norm gives the usual linear distance between a point in space and the origin, as could for instance be measured using a ruler.

In another embodiment, a weighted average of the color error components is computed.

In a preferred embodiment, the system also computes a gradient term along the common boundary between the candidate segment and the neighboring segment. The gradient term measures how sharp the transition is at the boundary between segments, so it provides a measure of whether the boundary represents a true edge in the image frame. For every edge of the common boundary, a local gradient is computed using a weighted sum of the pixel values in the band of 8 pixels surrounding the edge. In one embodiment, the weights are distributed as follows (with reference to the 8 pixels in the local band around edge 624 of FIG. 6): 0.0916 for pixel 614, 0.1430 for pixel 612, 0.0641 for pixel 610, and 0.0114 for pixel 608, and symmetrical negative weights −0.0916 for pixel 616, −0.1430 for pixel 618, −0.0641 for pixel 620, and −0.0114 for pixel 622. The absolute value of the sum of pixel color values with these weights provides the local gradient g at an edge. This local gradient g is computed for each of the three color components. The weights, which were arrived at empirically, are symmetrically smoothed over several pixels to avoid errors due to incidental variations, outlines, or slightly misplaced segment boundaries. In another embodiment, the local gradient g is simply the absolute value of the difference between color values in the two pixels adjacent to the boundary edge (e.g. pixel 614 and 616) with equal weights.

In another embodiment, a gradient may be taken diagonally with respect to the segment boundary, and the orthogonal and diagonal gradient color components may be combined using a weighted sum.

At a given boundary edge, the three local gradients (one for each color component) are combined to produce a single gradient value G at that edge. In one embodiment, a weighted sum of the three local gradients produces G. In this embodiment, the following weights (arrived at empirically to best capture boundary transitions) might be used, where subscripts y, u, v denote the color component, w is a reference weight, the mean Y-color value over all eight local pixels in the band is $\mu_y$, and $w_y$, $w_u$, $w_v$ are the desired weights for each color:

$$w + \frac{2}{1+e^{\frac{-|g_y|}{5}}} - 1,$$

$$w_u = w_v = \left(1 - \frac{w}{2}\right)\left(2 + \frac{2}{1+e^{\frac{(\mu_y-40)}{2.5}}}\right),$$

$$w_y = 1.$$

With these weights, $G = w_y g_y + w_u g_u + w_v g_v$. In another embodiment, $G = \|(g_y, g_u, g_v)\|$, where $\|\cdot\|$ denotes the Euclidean norm.

A median-filtered average gradient $\Delta G$ is calculated by taking medians of every set of three such gradient values G at consecutive boundary edges and by then taking the mean of all of these median gradients (in like fashion as in the calculation of the median-filtered average color variation $\Delta c$).

For both the gradient and color error components, it is possible to take a mean of the set of values calculated at the boundary edges. In the preferred embodiment, a median filter is used first on the set of values to remove outlying error values.

The system preferably computes both the length of the common boundary between the candidate segment and the neighboring segment and the total length of the boundary of the candidate segment. In the preferred embodiment, if the common boundary is less than a threshold percentage of the total boundary length of the candidate segment, e.g. 20% of the total length, then the neighboring segment is assigned an error statistic E value that is greater than the threshold function so that this neighboring segment will not be merged with the candidate segment. The system also computes the area of the candidate segment and the area of the neighboring segment. If the area of the neighboring segment is less than the area of the candidate segment, then the neighboring segment is similarly assigned an error statistic E value that is greater than the threshold function. If the common boundary meets this minimum length criterion and the neighboring segment is larger than the candidate segment, however, then the system computes the error statistic E for the neighboring segment as $E = \Delta G \cdot \Delta c$.

One skilled in the art will contemplate a variety of other potential means for computing the error statistic E. It is preferable, but not necessary, that the error statistic include measures of the difference in color, difference in variance, and gradient between segments in order to adequately determine whether or not they are likely to belong to the same object. However, applications and computational or speed limitations may dictate that other combinations of the merging parameters be used to compute E.

In the preferred embodiment, the system computes this error statistic E for each neighboring segment around a candidate segment and then determines which neighbor has the smallest E value. The system compares this smallest error statistic E to the threshold function, and if the error is below the threshold the system merges the two segments into one supersegment. Different threshold functions may be chosen according to the desired application, but preferably the function should have a lower threshold for larger segments and a higher threshold for smaller segments. In one embodiment, if the candidate segment is sufficiently small then it will always be merged with its best-matching neighbor, without regard to a threshold (in this case the threshold may be said to be infinite over a certain range of segment sizes). In another embodiment, if the candidate segment is sufficiently large then it will never be merged with any neighbor (in this case the threshold will equal zero over a certain range of segment areas).

The reason for adjusting the error threshold for different segment areas stems from the application of this process to reducing the amount of information that must be transmitted from the encoder to the decoder during video compression. Merging segments that do not match perfectly causes the decoder to create imperfect predictions, and thus it requires additional residual data to be included in the bit stream for accurate reconstruction. In the case of small segments, merging the segments saves bits in the transfer of motion information and introduces only minimal imperfection since only a small area is affected. Thus, the tradeoff allows for a reduction of the number of bits required. However, in the case of larger segments, inaccurate merging may introduce significant error, and thus the bits required for residual corrections may outweigh the comparatively small bit savings coming from reduced motion information. Therefore, larger segments should only be merged when they are extremely similar and thus very likely to be parts of the same object.

In one embodiment, the system makes a tiebreak decision in case two or more neighbors are sufficiently close to the minimum error relative to the candidate segment. The one of these neighbors with the smallest area is selected. If this neighbor's error statistic E is below the threshold function, it is merged with the candidate segment. If its error statistic E is above the threshold function, no merging occurs (even though the other competing neighbor may have slightly lower error E that could be below the threshold).

In an alternative embodiment of the present invention, the error statistic between a neighboring segment and a candidate segment is computed from merging parameters that provide more than just local information near the boundary. In this embodiment, means of all the pixel values in each segment are computed for each of the three color components. Variances are also computed for the three colors using all pixel values in each segment. The differences in the means and variances result in $\Delta m$ and $\Delta v$ as before for each color component. As before, these corresponding values are multiplied for each color component and summed, resulting in an average color variation, $\Delta c$. The gradient parameter $\Delta G$ is computed as before, the error statistic is computed as $E = \Delta G \cdot \Delta c$, and the other aspects of this alternative embodiment are the same as in the preferred embodiment. This alternative embodiment may provide a more accurate determination of whether two segments belong to the same object, though it does so at increased computational cost compared to the preferred embodiment.

In yet another embodiment, average color variation $\Delta c$ and gradient parameter $\Delta G$ are used directly to determine whether to merge. In this embodiment, $\Delta c$ may be compared to a first threshold function. If $\Delta c$ is smaller than the first threshold function, then the segments are merged. If $\Delta c$ is greater than a first threshold function, then it is compared to a second greater threshold function. If $\Delta c$ is less than the second greater threshold function, the $\Delta G$ is compared to a third threshold function. If $\Delta G$ is less than the third threshold function, then the segments are merged. If $\Delta G$ is not less than the third threshold function, then the segments are not merged. Also, if $\Delta c$ is greater than the second threshold function, then the segments are not merged. As before, the threshold functions may vary according to the area of the candidate segment.

In still another embodiment, mean color values and color variances are computed using all pixel values in the candidate segment, but for the neighboring segment only pixels that lie within an extended bounding box around the candidate segment are used to compute mean color and variance. As before, the differences $\Delta m$ and $\Delta v$ are found for each color component, then the sum of the product of corresponding color components results in a color variation $\Delta c$. The gradient parameter $\Delta G$ and the error statistic E are then computed using the same formulas as before.

In still another embodiment, the merging parameters are computed using one of the above methods and a decision rule is used to determine whether to merge the candidate segment with a given neighboring segment. In this embodiment, rather than computing a single error statistic E to be compared to a threshold, a plurality of merging parameters are determined and a decision rule maps some portion of the parameter space to a decision to merge. If the set of merging parameters for a candidate segment and a neighboring segment falls within the region of parameter space that maps to a merging decision, then the selected pair is merged. For instance, the parameter space might include the component parameters: mean color difference, variance ratio, gradient error, candidate segment size, and proportion of total candidate boundary shared with the neighbor. Defining a decision rule using a region of parameter space in this way is a generalization of the embodiments discussed above. For instance, the constraint that an error statistic E be below a threshold (which depends on candidate segment area) defines a region of the above parameter space that maps to a merging decision. In this conception, the additional restriction that the common boundary must be above a threshold percentage of the total boundary length of the candidate segment, e.g. 20% of the total length, adds another constraint that pares down the region of parameter space that maps to a merging decision (so there is no need for an altered definition of an error statistic E in this case).

After a merging decision is made for the current candidate segment, the system takes other eligible segments as candidate segments and performs the same steps so that multiple pairs of segments may be merged to form supersegments.

In the preferred embodiment, measures are taken to prevent unnecessary recalculation of the merging parameters for each subsequent candidate segment. During one or more raster scans of the frame (or a portion thereof), merging parameters including mean color, variance, gradient, area, and boundary length, are calculated in the manner described above and stored in a table. A list of neighboring segments for each segment in the frame (or a portion thereof) is also collected. A segment is selected as a candidate segment (for instance the smallest available segment may be chosen) and the merging parameters for this candidate segment and all of its neighbors are used to compute an error statistic for each neighbor. The candidate segment may be merged with one or more of its neighbors using the heuristics described above. At this point, the process selects another segment as a candidate segment. Since merging parameters have already been computed, there is no need to repeat these calculations for most segments. However, these parameters must be updated for the recently formed supersegment and for any nearby segments that become neighbors of the new supersegment. Rather than scanning the frame (or a portion thereof) again to recompute these parameters, in the preferred embodiment the parameters for the segments comprising the supersegment are used to compute parameters for the new supersegment. For example, if the Y-component variance $v_y$ is computed over an entire segment, then the combined variance $v_y$ of the supersegment formed by merging segments A and B, with areas $S_A$ and $S_B$ respectively, may be computed as $(S_A v_{y,A} + S_B v_{y,B})/(S_A + S_B)$. Mean color parameters may be calculated analogously. Gradients between the new supersegment and its neighbors may be calculated also using a weighted sum of the gradients between each original segment and the neighbor, with the weighting determined by the respective common boundary lengths. In case color means and variances are computed only in a neighborhood of the boundary, relative boundary lengths for the two original segments may be used as weights to compute new color means and variances for the supersegment. Computing updated merging parameters in this way minimizes computation and allows the process to rapidly proceed from one candidate segment to the next until a plurality of merging decisions have been made. Segments are iteratively merged until a minimum number of segments for the frame is reached, or until all segments have been considered as candidates, or until no more segments pass the threshold criterion for merging.

5 Segment Merging Apparatus

Figure 7:
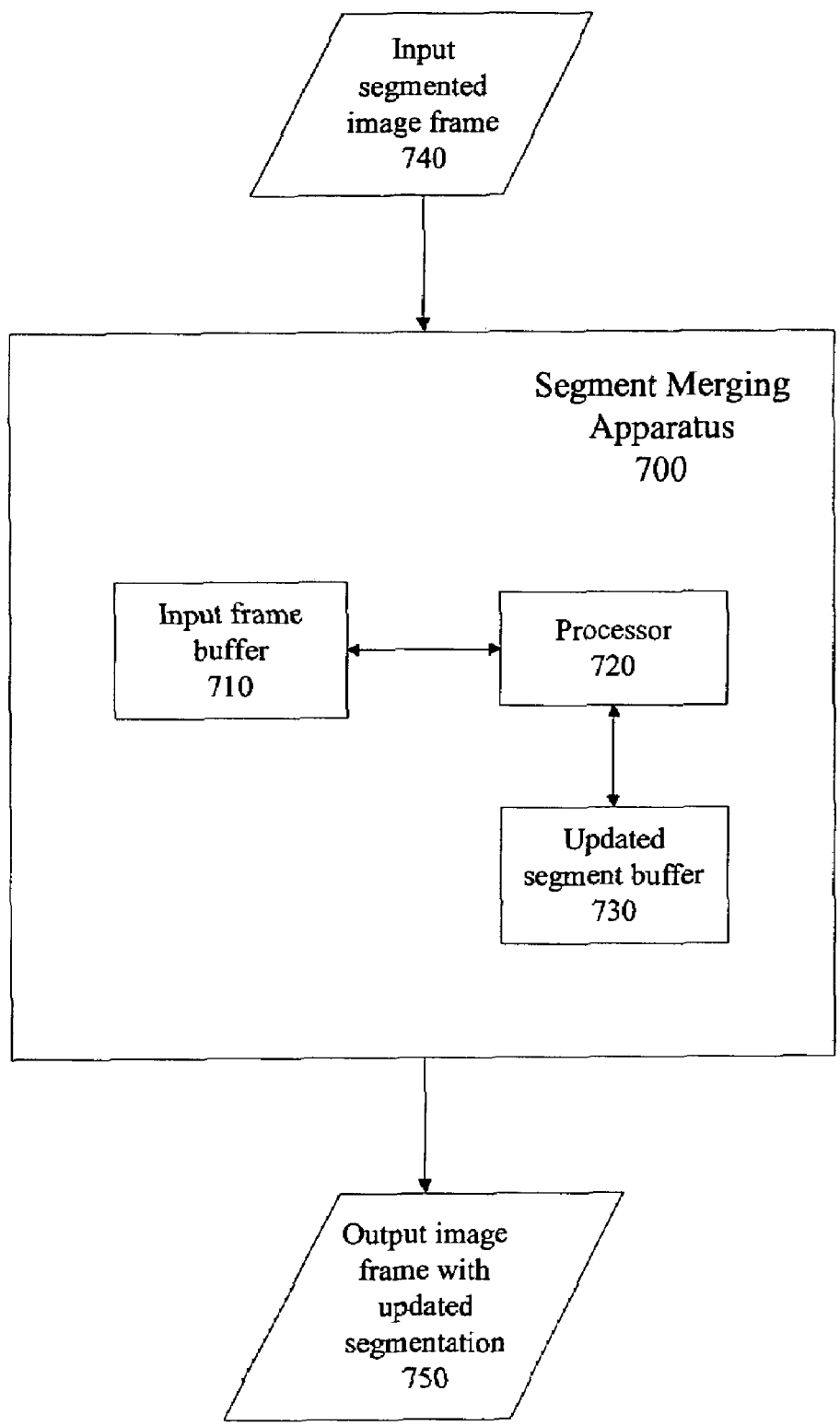
FIG. 7 is a block diagram of an apparatus for merging image segments in accordance with an embodiment of the invention.

FIG. 7 is a block diagram illustrating the main components of a segment merging apparatus 700 in accordance with an embodiment of the invention. The apparatus 700 is configured to merge segments in a segmented image frame according to the disclosed method. An input frame buffer 710 receives a segmented frame as input, including color data and segment assignments for each pixel in the frame. A processor 720 computes merging parameters for each relevant pair of neighboring segments and determines which pairs should be merged. An updated segment buffer 730 records new segment assignments for each pixel in accordance with merging operations performed by the processor 720.

The segment merging apparatus 700 may receive as input a segmented image frame 740. Such an input frame may for instance be one frame in a video sequence. The segment merging apparatus 700 may provide as output an image frame with updated segmentation 750. Such an output frame may for instance have fewer segments because two or more segments in an input frame were merged to create supersegments.

Note that the segment merging apparatus 700 may be embodied within a computer (including a personal computer, a network server, or any other computer architecture) running a specifically-designed application program such that the computer's central processing unit (CPU) and memory carry out the operations described herein. The segment merging apparatus 700 may also be embodied as a specifically-designed hardware device, including both processing and memory circuitry, which are designed to carry out a sequence of operations including the specific operations detailed herein.

6 Conclusions, Ramifications, and Scope

The choice between these embodiments or various other embodiments of the present invention that may readily be contemplated by one with ordinary skill in the relevant art may be guided by the application, for instance by constraints on the processing time needed to encode and to decode video data.

While the preferred embodiment of the invention addresses the task of compressing video data, a variety of applications for merging segments exist. The disclosed process for merging segments need not apply to video data, but may rather be applied to segmentation of individual images. In particular, the disclosed merging process can address issues of over-division that commonly arise in the segmentation of images. The disclosed process may also for instance be applied to problems of object identification, object tracking, medical imaging, and computer vision.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of video encoding or decoding including merging segments to form supersegments in an image, wherein said image consists of a plurality of segments that are constituent portions of the image, the method of video encoding or decoding comprising:

identifying at least one candidate segment(s);

identifying at least one neighboring segment(s) for each candidate segment;

computing an error statistic for each pair, wherein each pair consists of a candidate segment and a corresponding neighboring segment;

determining a neighboring segment that results in a smallest error statistic for a given candidate segment;

determining whether said smallest error statistic is sufficiently small so as to be less than a threshold value so as to merit merging of the corresponding pair of segments; and merging said corresponding pair of segments to create one supersegment if said smallest error statistic is less than the threshold value, wherein a supersegment is a new segment comprising all pixels formerly contained in one of the two segments that were merged, wherein said error statistic is computed using one or more merging parameters selected from the group consisting of a difference in mean color between the two segments, a difference in color variance between the two segments, a measure of a color gradient along a common boundary between the two segments, a length of the common boundary, a total boundary length of the candidate segment, an area of the candidate segment, and an area of the neighboring segment.

2. The method of claim 1, wherein the error statistic for a pair consisting of a candidate segment and a neighboring segment is set above the threshold value if the common boundary between the segments is smaller than a cutoff percentage of the total boundary length of the candidate segment.

3. A method of video encoding or decoding including merging segments to form supersegments in an image, wherein said image consists of a plurality of segments that are constituent portions of the image, the method of video encoding or decoding comprising:
  identifying at least one candidate segment(s);
  identifying at least one neighboring segment(s) for each candidate segment;
  computing an error statistic for each pair, wherein each pair consists of a candidate segment and a corresponding neighboring segment;
  determining a neighboring segment that results in a smallest error statistic for a given candidate segment;
  determining whether said smallest error statistic is sufficiently small so as to be less than a threshold value so as to merit merging of the corresponding pair of segments; and
  merging said corresponding pair of segments to create one supersegment if said smallest error statistic is less than the threshold value, wherein a supersegment is a new segment comprising all pixels formerly contained in one of the two segments that were merged,
  wherein the error statistic for a pair consisting of a candidate segment and a neighboring segment is set above the threshold value if the area of the neighboring segment is smaller than the area of the candidate segment.

4. The method of claim 1, wherein the threshold value varies according to the area of the candidate segment.

5. A method of merging segments to form supersegments in an image, wherein said image consists of a plurality of segments that are constituent portions of the image, the method comprising:
  identifying at least one candidate segment(s);
  identifying at least one neighboring segment(s) for each candidate segment;
  computing an error statistic for each pair, wherein each pair consists of a candidate segment and a corresponding neighboring segment;
  determining a neighboring segment that results in a smallest error statistic for a given candidate segment;
  determining whether said smallest error statistic is sufficiently small to merit merging of the corresponding pair of segments;
  merging said corresponding pair of segments to create one supersegment if said smallest error statistic is sufficiently small to merit said merging, wherein a supersegment is a new segment comprising all pixels formerly contained in one of the two segments that were merged; and
  using a tiebreak criterion in the case when more than one neighboring segment is sufficiently close to the minimum error statistic, said tiebreak criterion selecting the one of said neighboring segments that has smallest area.

6. The method of claim 1, wherein multiple neighboring segments are merged with a candidate segment wherein each of the neighboring segment's error statistic is below the threshold value.

7. A method of video encoding or decoding including merging segments to form supersegments in an image, wherein said image consists of a plurality of segments that are constituent portions of the image, the method of video encoding or decoding comprising:
  identifying at least one candidate segment(s);
  identifying at least one neighboring segment(s) for each candidate segment;
  computing an error statistic for each pair, wherein each pair consists of a candidate segment and a corresponding neighboring segment;
  determining a neighboring segment that results in a smallest error statistic for a given candidate segment;
  determining whether said smallest error statistic is sufficiently small so as to be less than a threshold value so as to merit merging of the corresponding pair of segments; and
  merging said corresponding pair of segments to create one supersegment if said smallest error statistic is less than the threshold value, wherein a supersegment is a new segment comprising all pixels formerly contained in one of the two segments that were merged,
  wherein the error statistic E for a pair of segments is computed according to the formula $E = \Delta c \cdot \Delta G$, wherein $\Delta G$ is a measure of the gradient along the boundary between the segments and $\Delta c$ is a measure of the difference in mean color and color variance between the segments.

8. The method of claim 7, wherein:
$\Delta c = \Delta m_y \Delta v_y + \Delta m_u \Delta v_u + \Delta m_v \Delta v_v$, wherein $\Delta m$ is a measure of the difference between the mean intensity values for the candidate and neighboring segments, wherein $\Delta v$ is a measure of the difference between the variances of intensity values for the candidate and neighboring segments, and wherein the subscripts y, u, v denote the Y, U, and V color components, respectively;

$G = w_y g_y + w_u g_u + w_v g_v$, wherein each of $g_y$, $g_u$, and $g_v$ are local color gradients (in the Y, U, and V color components) at a single boundary edge and $w_y$, $w_u$, and $w_v$ are weights; and $\Delta G$ is found by taking the medians of the G values at every n consecutive edges of the common boundary and then taking the mean of this collection of median values.

9. The method of claim 1, wherein said error statistic is calculated in a neighborhood of the common boundary between the candidate segment and the neighboring segment.

10. The method of claim 9, wherein said neighborhood of the common boundary consists of a fixed number of pixels on either side of and perpendicular to each boundary edge.

11. The method of claim 9, wherein said error statistics are calculated during a raster-scan through an array of pixels and stored in a table, and wherein said error statistics are updated whenever two or more segments are merged to form a supersegment to correct the values for the new supersegment and its neighboring segments, whereby merging decisions for a plurality of candidate segments may be made by referring to the data contained in said table.

12. A method of merging segments to form supersegments in an image, wherein said image consists of a plurality of segments that are constituent portions of the image, the method comprising:

identifying at least one candidate segment(s);

identifying at least one neighboring segment(s) for each candidate segment;

computing an error statistic for each pair, wherein each pair consists of a candidate segment and a corresponding neighboring segment;

determining a neighboring segment that results in a smallest error statistic for a given candidate segment;

determining whether said smallest error statistic is sufficiently small to merit merging of the corresponding pair of segments; and merging said corresponding pair of segments to create one supersegment if said smallest error statistic is sufficiently small to merit said merging, wherein a supersegment is a new segment comprising all pixels formerly contained in one of the two segments that were merged, wherein said error statistic is calculated using only the pixels in the neighboring segment which lie within an extended bounded box around the candidate segment.

13. An apparatus for video encoding or decoding including means for merging segments to form supersegments in an image, wherein said image consists of a plurality of segments that are constituent portions of the image, the apparatus comprising: means to identify at least one candidate segment(s); means to identify at least one neighboring segment(s) for each candidate segment; means to compute an error statistic for each pair, wherein each pair consists of a candidate segment and a corresponding neighboring segment; means to determine a neighboring segment that results in a smallest error statistic for a given candidate segment; means to determine whether said smallest error statistic is sufficiently small to merit merging of the corresponding pair of segments; and means to merge said corresponding pair of segments to create one supersegment if said smallest error statistic is sufficiently small to merit said merging, wherein a supersegment is a new segment comprising all pixels formerly contained in one of the two segments that were merged, and wherein said error statistic is computed using one or more merging parameters selected from the group consisting of a difference in mean color between the two segments, a difference in color variance between the two segments, a measure of a color gradient along a common boundary between the two segments, a length of the common boundary, a total length of a boundary of the candidate segment, an area of the candidate segment, and an area of the neighboring segment.

14. The apparatus of claim 13, wherein the apparatus is embodied in a computer that includes a CPU and memory and a specifically-designed application program.

15. The apparatus of claim 13, wherein the apparatus is embodied in a specifically-designed hardware device, including both processing and memory circuitry.

* * * * *